United States Patent
Ripley

(10) Patent No.: US 7,761,683 B2
(45) Date of Patent: Jul. 20, 2010

(54) VARIABLE WIDTH MEMORY SYSTEM AND METHOD

(75) Inventor: Brian N. Ripley, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 819 days.

(21) Appl. No.: 10/091,698

(22) Filed: Mar. 5, 2002

(65) Prior Publication Data

US 2003/0172243 A1      Sep. 11, 2003

(51) Int. Cl.
  *G06F 12/02*   (2006.01)
  *G06F 12/04*   (2006.01)
(52) U.S. Cl. .................... 711/170; 711/171; 711/172; 711/173; 711/202; 711/212
(58) Field of Classification Search ............... 711/202, 711/170, 171, 172, 173, 212
See application file for complete search history.

(56) References Cited

U.S. PATENT DOCUMENTS

| 6,230,249 | B1* | 5/2001 | Chan et al. | 711/212 |
| 2003/0005254 | A1* | 1/2003 | Triece et al. | 711/200 |
| 2003/0158995 | A1* | 8/2003 | Lee et al. | 711/105 |
| 2004/0019756 | A1* | 1/2004 | Perego et al. | 711/170 |

* cited by examiner

*Primary Examiner*—Sanjiv Shah
*Assistant Examiner*—Midys Rojas

(57) ABSTRACT

A variable width memory system is disclosed. The variable width memory system facilitates efficient utilization of memory resources and delivery of information in a convenient manner. A plurality of memory locations store information and the bit widths of at least two of the memory locations are different. A controller directs access to the plurality of memory locations. Information is communicated between the controller and memory locations via a bus coupled to the controller and memory locations.

22 Claims, 6 Drawing Sheets

US 7,761,683 B2

VARIABLE WIDTH MEMORY SYSTEM AND METHOD

TECHNICAL FIELD

The present claimed invention relates to the field of memory assignment.

BACKGROUND ART

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, these advantageous results are realized through the use of information stored on a memory media and manipulated by a processing device. The configuration of the information storage can have significant impacts on the performance of an information processing system.

Numerous electronic devices include processors that operate by executing programs comprising a series of instructions for manipulating data in the performance of useful tasks. The programs and associated data are typically stored in a memory. Memories usually consist of a location for storing information and a unique indicator or address. Each location usually stores the same number of bits referred to as the memory width. When information is written to or read from a memory location the entire storage capacity of that location is committed to that piece of information regardless of whether the information fills the resources of that location. The utility a device provides often depends upon the speed and efficiency at which instructions are executed. The ability to access a memory and transfer information quickly and conveniently usually has a significant impact on information processing latency.

The configuration of a memory usually affects the speed at which memory locations are accessed. Certain types of memories built upon flip flop circuits, such as a register included in a processor or a random access memory (RAM), offer the potential for relatively fast information access. However, there is typically a direct relationship between memory access speed and cost, the faster the access the greater the cost. It is significant waste of valuable resources when storage capacity in a RAM location is not utilized.

In addition to information access speed having a significant impact on processing latency, receiving information in a convenient and efficient format is important. Information is often conveyed from one system to another system in a format that is convenient for a communication level or convenient for a first component, but may not be convenient and efficient at another level or component. Memories typically have uniform memory widths but the information stored in the memory rarely is the same size. Memory locations are often underutilized and filled with superfluous filler bits. Processors usually attempt to access certain information from a memory and memories that provide extraneous information slow processors down because processing resources have to be committed to identifying and extracting the relevant information. Incomplete or extraneous information usually makes programming instructions much more difficult because provisions and adjustment have to be made to identify and extract the valid information. If information delivered from memory is incomplete, the processor has to wait for and track additional memory accesses that contain the missing information. If there is extraneous information the process has to identify and extract the valid information. Overall, processing operations are often slowed when processor operations are committed to interpreting extraneous information.

What is required is a system and method that facilitates efficient utilization of memory resources and delivery of information in a convenient manner.

DISCLOSURE OF THE INVENTION

A variable width memory system is disclosed. The variable width memory system facilitates efficient utilization of memory resources and delivery of information in a convenient manner. A plurality of memory locations store information and the bit widths of at least two of the memory locations are different. A controller directs access to the plurality of memory locations. Information is communicated between the controller and memory locations via a bus coupled to the controller and memory locations.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

A variable width memory system and method utilizes variable width memory locations to store information. The variable width memory locations are accessed by referencing unique identifiers. A precise number of bits corresponding to the width of the memory locations are transferred with each memory location access. Thus, memory resources are not consumed in otherwise wasteful activities such as storing superfluous information. Thereby, this method eliminates the need to make provisions for handling incomplete data such as providing extraneous filler bits. Furthermore, the memory does not have to make wrap around provisions to extra memory locations for information that would otherwise exceed the memory location capacity. A variable width memory system and method also facilitates maximized utilization of processing resources by delivering valid information with no extraneous bits that a processor would otherwise have to expend processing operations resolving.

Figure 1:
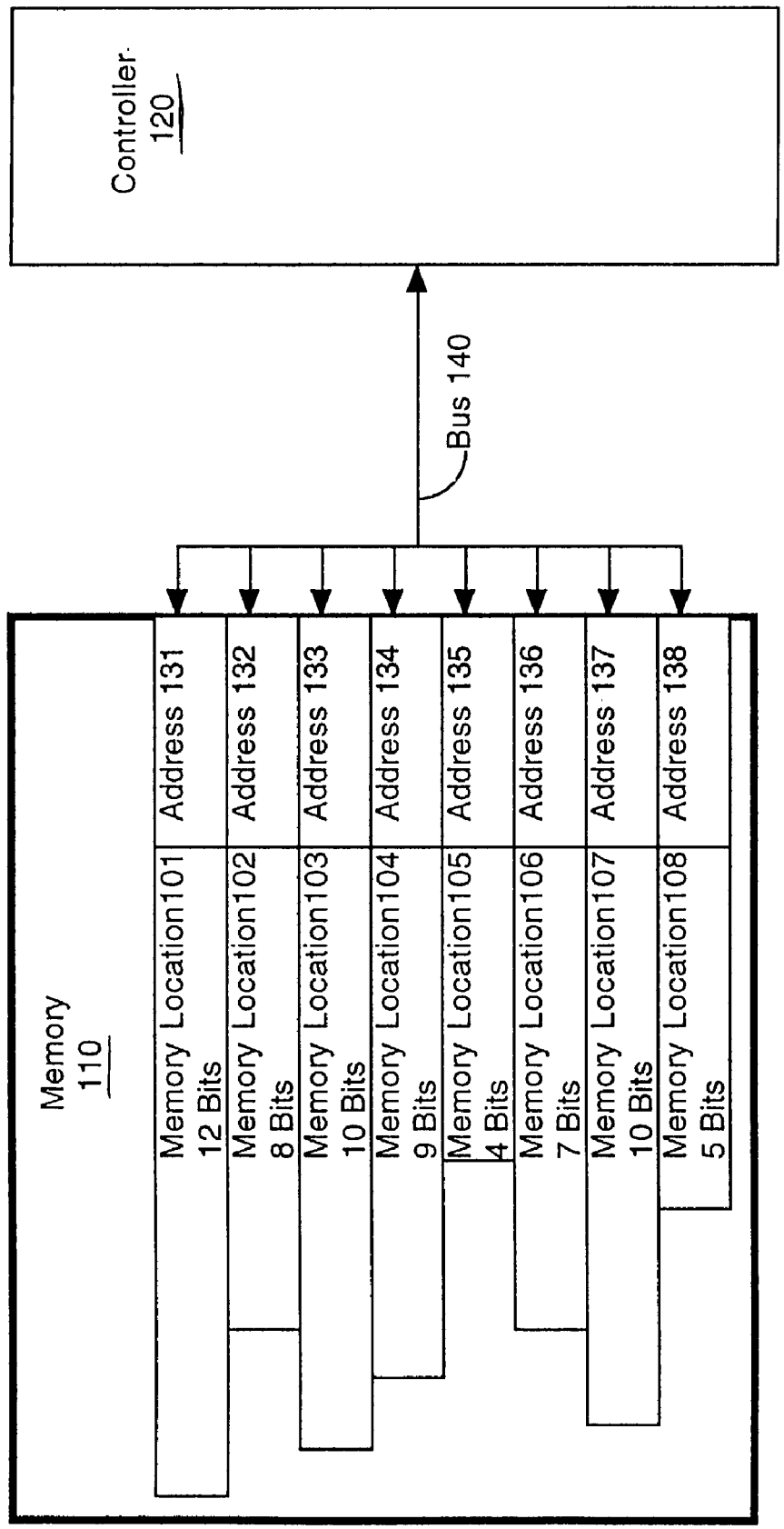
FIG. 1 is a block diagram of a variable width memory system in accordance with one embodiment of the present invention.

With reference now to FIG. 1, a block diagram of variable width memory system 100 is shown. Variable width memory system 100 includes a memory 110 with a plurality of memory locations or cells of various widths for storing information (e.g., 101-108). Memory location 101 has a width of 12 bits and memory location 102 has a width of 8 bits. It is also possible for some of the memory locations to have the same width (e.g., memory locations 103 and 107). Memory locations 101 through 108 are included on a single substrate, for example on a random access memory (RAM) chip. Controller 120 directs accesses to the memory locations. Each one of the memory locations (e.g., 101-108) is identified by a unique internal identifier (e.g., address 131-138) which is referenced by controller 120 to access the corresponding memory location. In one embodiment, controller 120 and memory locations 101 through 108 are coupled to bus 140 for communicating information between them.

Variable width memory system 100 provides efficient information storage. Controller 120 maps the unique internal identifier to a particular external indicator (e.g., a processor name for a register). The unique internal identifier and the particular external indicator refer to components with the same bit capacity (e.g., bit width). Therefore, information referenced by a particular external indicator may be stored in a single memory location (e.g., 101) with a correlating bit width. Thus, the bits do not have to be placed into two memory locations (e.g., 101 can hold 12 bits) and the memory location does not waste memory resources on filler bits.

Variable width memory system 100 also facilitates efficient processing in one exemplary implementation. The widths of the memory locations (e.g., 101-108) are configured in accordance with criteria directed at decreasing external processor (e.g., a central processing unit) operations. When controller 120 maps a unique internal identifier to a particular external indicator it ensures that the memory location corresponding to the unique internal identifier (e.g., memory address) has the same number of bits a request referencing the particular external indicator is anticipating. Thereby, controller 120 does not have to track multiple memory locations for a particular external indicator. Furthermore, when controller 120 forwards information form a memory location in response to a request for information associated with the particular external indicator, the receiving component does not have to expend processing resources extracting valid bits and eliminating extraneous bits.

Figure 2:
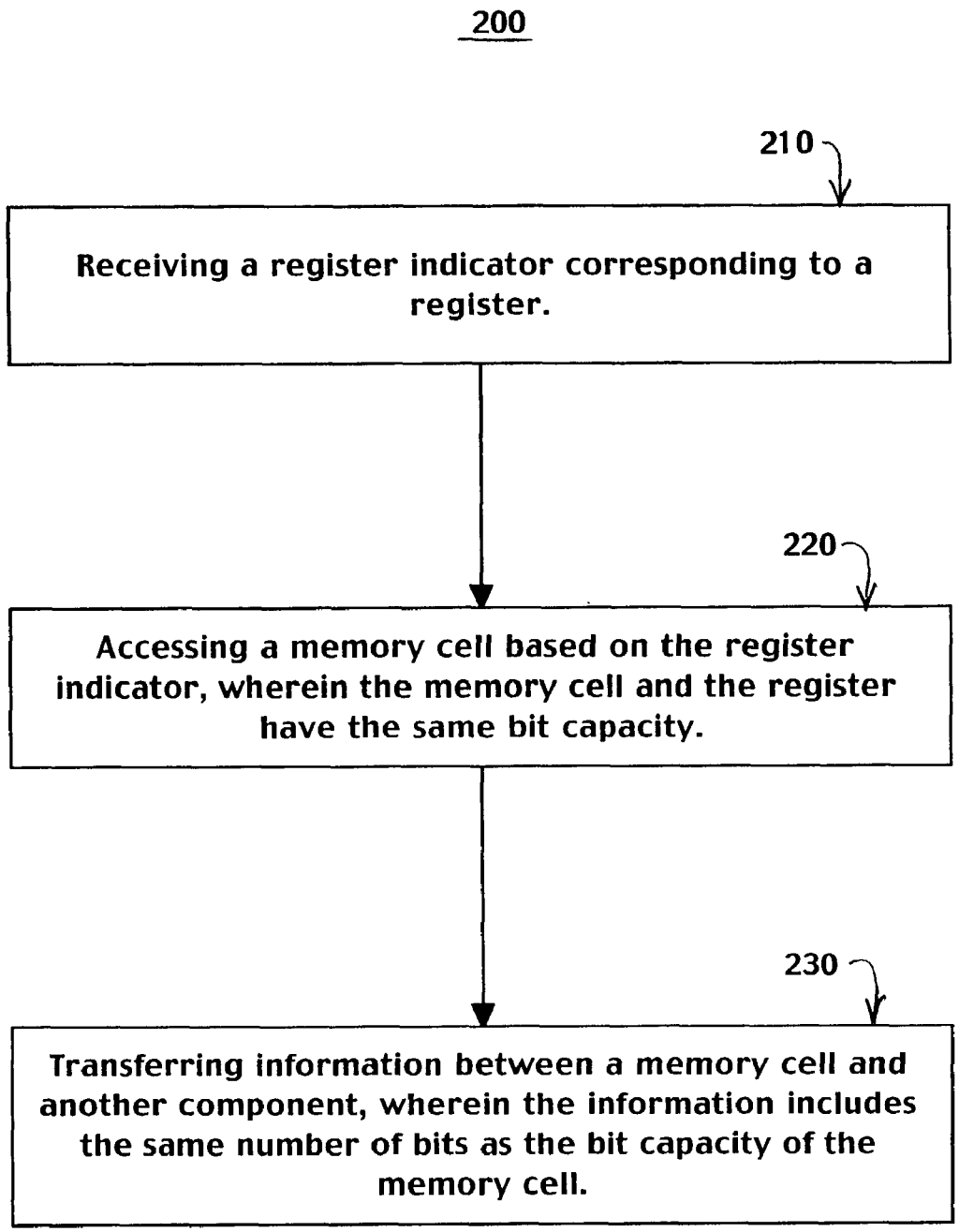
FIG. 2 is a flow chart of a variable width memory mapping process for mapping variable width memories in accordance with one embodiment of the present invention.

FIG. 2 is a flow chart of variable width memory mapping process 200 for mapping variable width memories. The variable width memory mapping process 200 facilitates refined utilization of memory resources in an advantageous manner. Memory resources are not occupied by superfluous filler bits and external processing operations are not consumed separating irrelevant bits from valid bits.

In step 210 a register indicator corresponding to a register is received. The register indicator can be a register designator or register name. The register is a physical register (e.g. a central processing unit register). Alternatively, the register indicator is utilized to reference a specific piece or type of information and not necessarily a physical register.

A memory cell based on the register indicator is accessed in step 220, wherein the memory cell and the register have the same bit capacity. For example, the memory cell and the register have the same bit width. The memory cell is accessed to implant or extract information from the cell by manipulating the logical values of bits included in the cell. A memory cell is mapped to the register indicator and a look up table is utilized to provide the correlation for the mapping.

In step 230 information is transferred between the memory cell and another component. The information can be part of a communication packet. The information includes the same number of bits as the bit capacity of the register. The bit capacity is determined by processing criteria associated with a processor. The information includes data associated with certain fields and in one example the bits are sequentially located within the memory cell.

Figure 3A:
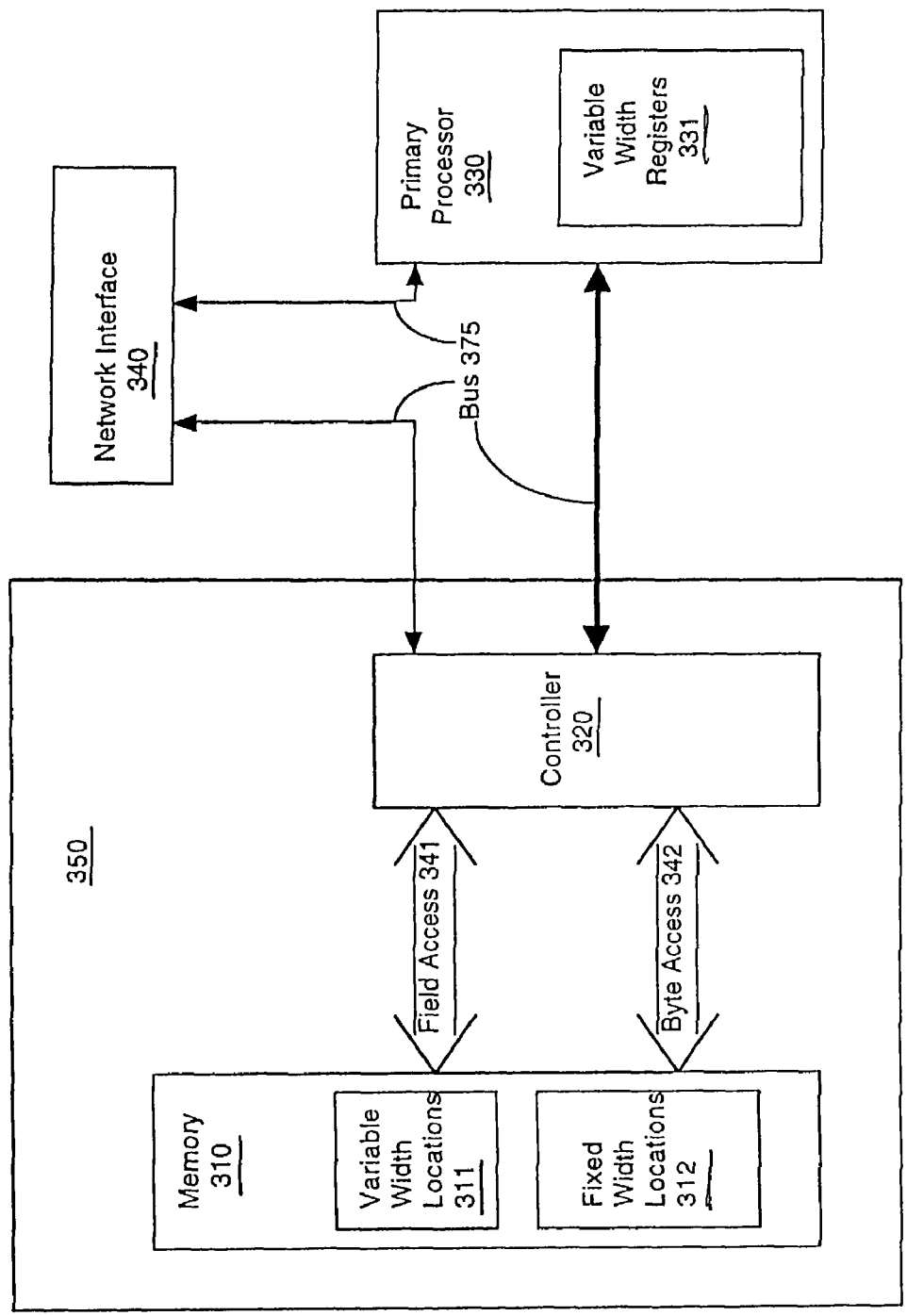
FIG. 3A is a block diagram of an exemplary computer network device for implementing one embodiment of a variable width memory mapping process.

With reference now to FIG. 3A, a block diagram of an exemplary computer network device 300 for implementing variable width memory mapping process 200 is shown. Specifically, network device 300 enables a data block to be accessed from outside of variable width memory system 350. A data block may be a communications packet being routed by computer network device 300 along a communications path. Network interface 340 is communicatively coupled with system 350 and primary processor 330 via bus 375. Network interface 340 allows access between the variable width memory system 350 and the network.

Network device 300 utilizes a primary processor 330 outside of system 350 as a central processing unit for directing routing operations. Primary processor 330 utilizes variable width registers (e.g., 331) to store information downloaded from variable memory width assignment system 350. Primary processor 330 uses bus 375 to access system 350 and communicate information between primary processor 330 and system 350. Although variable width register 331 is shown in FIG. 3A as being located on primary processor 330, variable width register 331 may be optionally found in a location separate from primary processor 330. Furthermore, although primary processor 330 is shown outside system 350, a processor such as primary processor 330 can perform the functions of controller 320.

The variable width memory system 350 of network device 300 is similar in function to variable width memory system 200. In the present embodiment, variable width memory system 350 comprises controller 320 and memory 310. Controller 320 can access memory 310 using multiple formats, including by field access 341, byte access 342, or a combination of both. For illustrative purposes, memory 310 has been compartmentalized to show both variable width memory locations 311 and fixed width memory locations 312. Alternatively, the variable width memory locations 311 and fixed width memory locations 312 are not isolated.

With reference still to FIG. 3A, a data block in a communications packet is accessed by controller 320 and bits within the data block identified and downloaded. For example, security information, addressing information, file requirements, overviews of the block of data, and the like, may be selected to be stored in memory 310. Upon selection, the bits of data are downloaded to memory 310 in a manner similar to that described above. Portions of data that vary in size, either alone or in combination, from a number of bits found in a standard fixed memory location (for example a standard of eight bits) are stored in variable width memory locations (e.g., 311) containing sufficient storage space to handle various sizes. The data can also be stored in the fixed width memory locations 312 in addition to the variable width memory locations 311.

The information is downloaded to the memory locations within memory 310 as designated by controller 320. Controller 320 may designate locations within memory 310 via field access 341. In general, field access 341 refers to bits associated with one or more fields that are stored in a variable width memory locations of memory 310. For example, if controller 320 wishes to access a field of data such as the security field, then memory 310 returns the contents of a memory location which contains security field information. However, if controller 320 wishes to access the data stored in memory 310 at the byte level, then fixed width memory location 312 is accessed and a specific number of bytes are downloaded as directed by the controller 320. Accordingly, the controller 320 has access to both variable bit width information and byte width information within the same variable width memory system 350.

With further reference to FIG. 3A, primary processor 330 can request that variable width register 331 return specific information. Accordingly, variable width register 331 accesses the information from memory 310 via controller 320. During the access, controller 320 delivers the contents of the variable width memory locations (e.g., 311) to the requesting variable width register (e.g., 331). The transfer of data may include a number of bits equal to the particular width of a variable width register 310. For example, if the number of bits stored in variable width memory location 311 is nine bits, then the transfer of the data from variable width memory location 311 to variable width register results in nine bits of data being stored in variable width register 331. In another embodiment, the transfer of data may include a number of memory locations transferring their bits to a variable width register equal to the particular width of the total number of transferred bits. However, a variable width register (e.g., 331) is not filled with irrelevant bits of data such as filler bits, place holders, etc. Thus, primary processor 330 receives valid bits and does not receive vast amounts of irrelevant data from variable width register (e.g., 331).

In one embodiment, the controller 320 receives register indicators (e.g., a register name) corresponding to registers of different widths. A register indicator is received from a processing system such as primary processor 330. System 350 performs a variable width mapping process which is utilized to transferred the information to and from variable width registers (e.g., 331). The variable width mapping process provides a correlation between a variable width memory location (e.g., 311) and a register indicator. Accesses to a location of memory 310 are based on the mapping of the register indicator. In general, memory 310 locations comprise widths equal to the particular widths of variable width registers. Moreover, the particular width of the variable width register could be determined by the criteria of a processing system such as processing system 330.

Figure 3B:
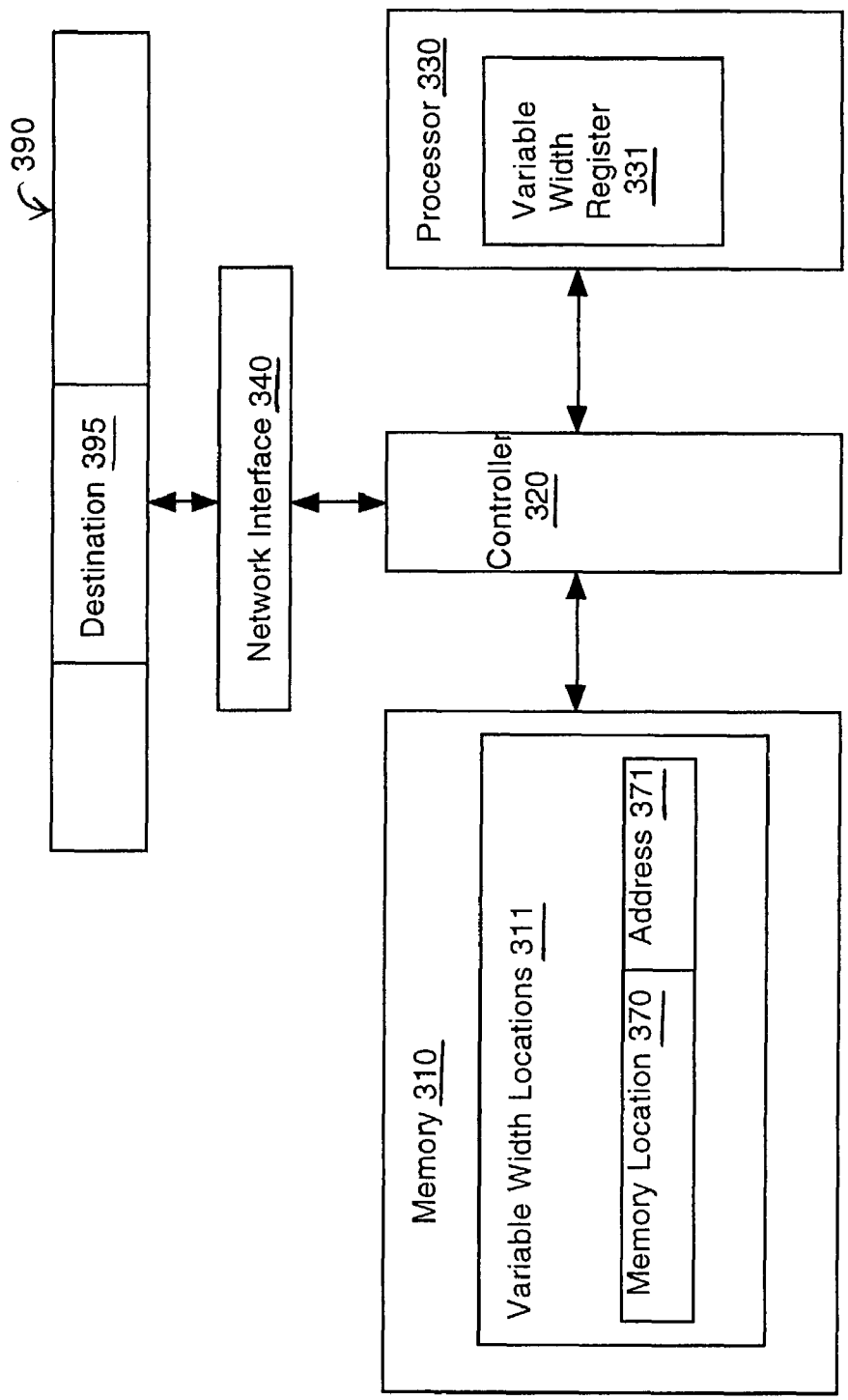
FIG. 3B is a data flow diagram illustrating one embodiment of data flow for a computer network device using a variable width memory mapping process.

FIG. 3B is a data flow diagram illustrating the flow of data for one embodiment of a variable width assignment method utilized in building a communications packet routing system. For example, the data is a communications packet 390 containing a portion for providing an indication of a destination. The data block configuration specification dictates that the indication is in section 395. Processor 330 needs to process the destination information as part of the routing operations so that the packet is forwarded to the intended location. By analyzing the data block configuration specification of the communications packet 390, the bits in section 395 are identified (e.g., 12 bits) as a portion of communications packet 390 that includes information grouped in an arrangement that facilitates reduction of processing instructions. If the bits in section 395 are provided to processor 330 with extraneous information when processor 330 attempts to retrieve the destination information from variable width register 331, processor 330 has to engage in processing operations that uniquely identify bits associated with the destination and separate them from extraneous information. Thus, assigning a memory location (e.g., 201) a width equal to destination indication 395 (e.g., 12 bits) ensures that no memory is wasted on dummy bits and with proper memory mapping the complete destination indication is provided without extraneous bits.

In the present example, controller 320 performs mapping functions associated with an access to memory location 370. When network interface 340 forwards packet 390 to controller 320 for storage in memory 310, controller 320 stores the bits from destination section 395 in memory location 370 identified by address 371. Controller 320 also provides a mapping between address 371 variable width register 331 since processor 330 utilizes variable width register 331 for calling destination information. Controller 320 utilizes a look up table that correlates variable width register 331 with address 371. When processor 330 calls for the destination information in variable width register 331, controller 320 looks up address 371 and sends the information in memory location 370 to variable with register 331. Thus, processor 330 calls for variable width register 331 return the destination information without extraneous information. Variable width register 331 can be a "virtual register" and memory 310 serves as a memory mapped register.

Figure 4:
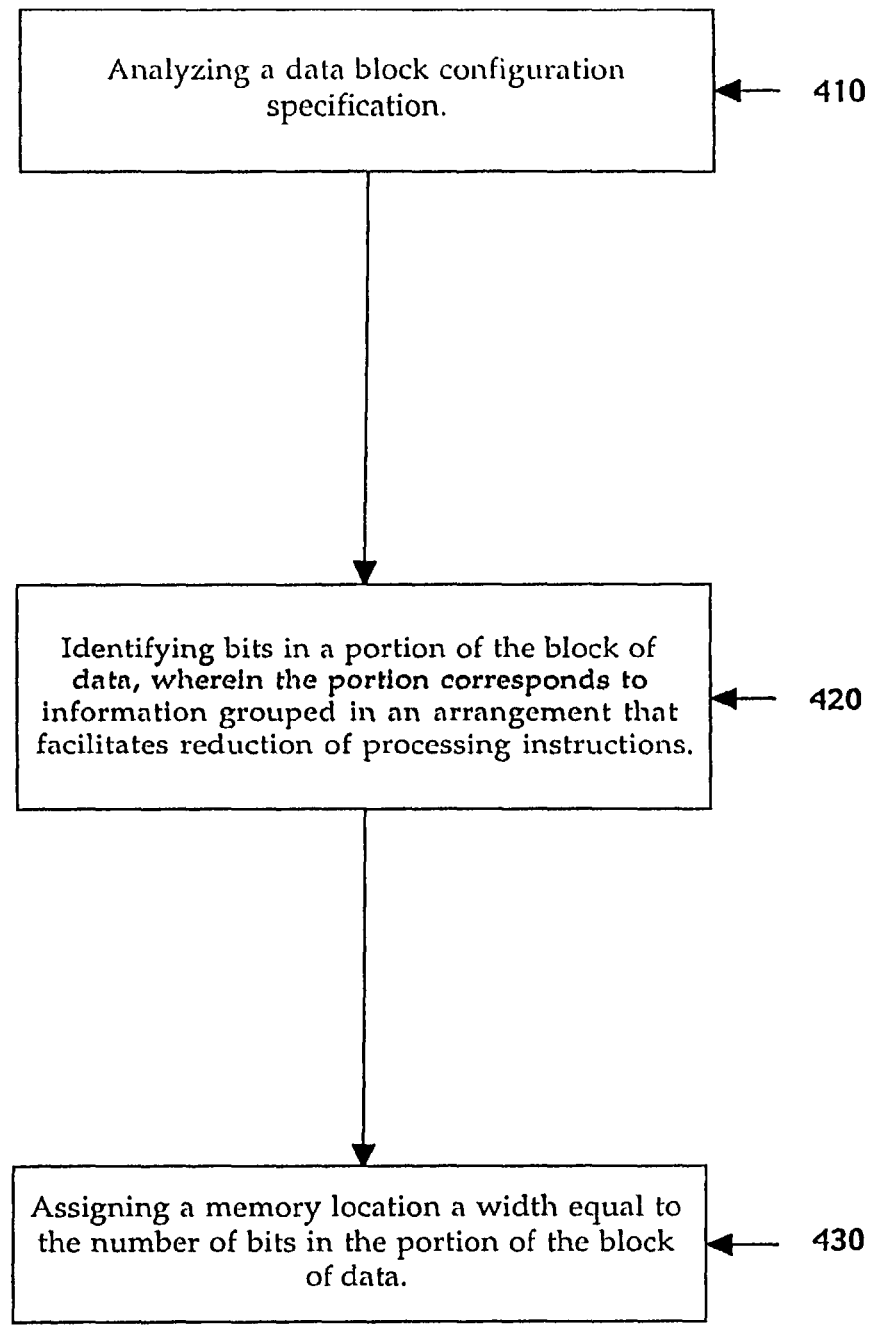
FIG. 4 is a flowchart of a variable memory width assignment method in accordance with one embodiment of the present claimed invention.

FIG. 4 is a flowchart of process 400 performed in accordance with an embodiment of a variable memory width assignment method. In general, the present embodiment variable memory width assignment ensures that memory locations are efficiently configured. The width of a memory location is assigned based upon a convenient grouping of the information. The bits stored in a memory location are grouped in an arrangement that facilitates reduction of processing instructions. The assigning of memory location widths based upon anticipated write operations facilitates the reduction of wasteful dummy bits utilized as fillers.

Although specific steps are disclosed in flowchart 400, such steps are exemplary. That is, the present embodiment is well suited to performing various other steps or variations of the steps recited in FIG. 4. Furthermore, it should be appreciated that the steps of flowchart 400 may be performed by software, by hardware, or by any combination of software and hardware.

With reference now to step 410 of FIG. 4, a data block configuration specification is analyzed. In general, the data block configuration specification defines the type and/or location of data within the data block. A data block configuration specification generally outlines the overall configuration of the contents of a data block. If the information regarding a destination address is contained on four bits within the data block, then the location of those four bits of data is designated in the specification as the location of the information providing a destination address. Therefore, the analysis of the data block utilizes the specification to surmise the overall configuration of the data block and the location of particular information within the data block. In one embodiment, a data block is a data file, data packet, digital media, voice file, or the like, which may be contained on, or transported over, a computer system, network, processor, etc.

With reference now to step 420, the bits in a portion of the data block are identified, wherein the bits correspond to information grouped in an arrangement that facilitates reduction of processing instructions. Upon completion of, or during, the analysis of the block of data, the present embodiment identifies bits that are utilized by a processor. Generally, determining the location of the identified bits is aided by the configuration specification of the data block.

In one embodiment, the desired portion of bits in the data block may be grouped in a header arrangement. The portion of bits are included in a leader portion placed within a data file that contains information such as destination address, sending address, security information, or the like. The rest of the block of data includes a compressed data file, a regular data file, or the like. For example, if the present embodiment is merely routing data, the only desired information from the data block is addresses, security info, or the like. The actual data being delivered is not even being accessed. The identified portion of bits are contiguous or discontiguous. The identified portion of bits may be a group of bits arranged in a specified alpha-numeric order in the data block or a group of bits arranged in random order throughout the data block.

With reference now to step 430 of FIG. 4, the present embodiment assigns the portion of bits in the data block to a memory location having an equivalent width. Specifically, a memory location is assigned a width based on the identified portions' number of bits. If the number of bits in the identified portion is 10, then a memory location is programmatically assigned a width of 10 bits.

In addition, the memory location is one of a plurality of memory locations having varying widths. Each memory location has a unique identifying address and reference to a single address will result in the return of the bits stored in a single memory location. Accordingly, as each portion of bits is identified, a memory location is allocated a correlating storage size. If the number of bits in the second identified portion is five, then a second memory location is allocated a storage capacity of five bits. Therefore, due to the varying widths of the memory location or locations, the identified portions of bits will fit into each memory location without overfilling or underfilling the memory location.

A memory location may be designated to receive more than one portion of bits. If the destination address is typically called with the originating address (e.g., four and five bits in width respectively) then both the originating address and the destination address are stored in the same memory location (e.g., that is 9 bits wide). Accordingly, a plurality of bits of information can be stored within a single memory location to save memory space. Thus, further providing for reduction of wasted memory space and the amount of filler bits. Therefore, a reduction in processing instructions is realized due to the removal of insignificant filler bits.

Optionally, variable memory width assignment includes a mapping step. The mapping step provides an association between said memory location and an external identifier. The memory location can be mapped to a register identifier that is associated with information stored in a specific memory location or address. A register identifier may also be associated with a plurality of memory locations or addresses. Therefore, in one embodiment, a call to a register returns the bits of data stored in one or more memory locations. Thus, when a destination address register is called, a correlating memory location is accessed and the destination address bits are downloaded.

Figure 5:
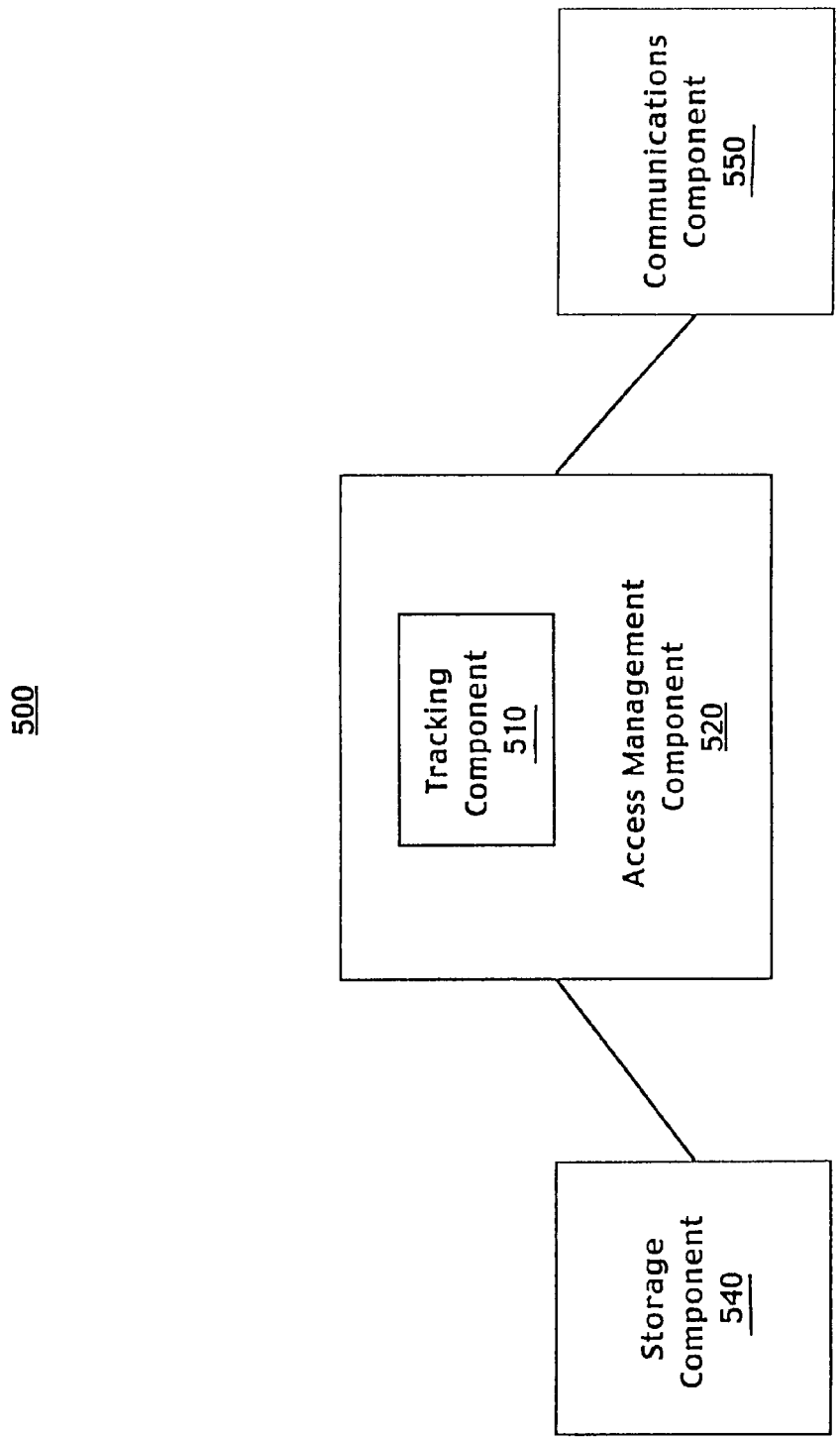
FIG. 5 is a block diagram of one embodiment of a variable memory width assignment system of the present invention.

FIG. 5 is a block diagram of an exemplary variable width memory assignment system 500 in accordance with one embodiment of the present claimed invention. In general, variable width memory assignment system 500 comprises a communication component 550 for communicating memory location identifiers. System 500 further comprises a storage component 540 for storing information in uniquely identifiable different width memory locations corresponding to the memory location identifiers. Additionally, system 500 further comprises an access management component 520 for controlling connections to the uniquely identifiable different width memory locations found in storage component 540.

Additionally, access management component includes a tracking component 510 for tracking a correspondence between the uniquely identifiable different width memory locations found in storage component 540 and register identifiers. The register identifiers are provided by a component (not shown) for processing the information. In response to an access request to retrieve information, the storage component 540 returns a number of bits equal to the width of one of the uniquely identifiable different width memory locations found in storage component 540.

Thus, a variable width memory system and method allows for efficient use of memory space. The variable width memory system and method does not require the commitment of expensive memory resources to activities that may well involve storing essentially useless information (e.g., extraneous filler bits). Processing instructions can also be reduced by providing information in a convenient manner that does not require processors to separate valid bits from extraneous bits. A variable memory width assignment method assigns memory locations of various capacities to unique identifiers. These unique identifiers can be mapped to external references relieving external resources from having to expend operating capacity on tasks associated with drawing a correlation between the unique identifiers and the external reference and ensuring that the returned information is in a proper configuration.

The foregoing descriptions of specific embodiments of the present invention have been presented for purposes of illustration and description. They are not intended to be exhaustive or to limit the invention to the precise forms disclosed, and modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

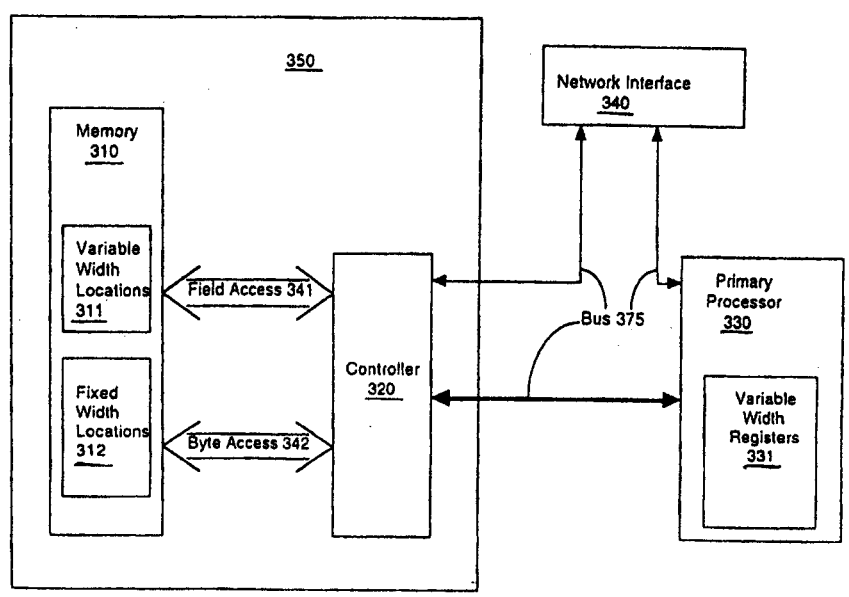

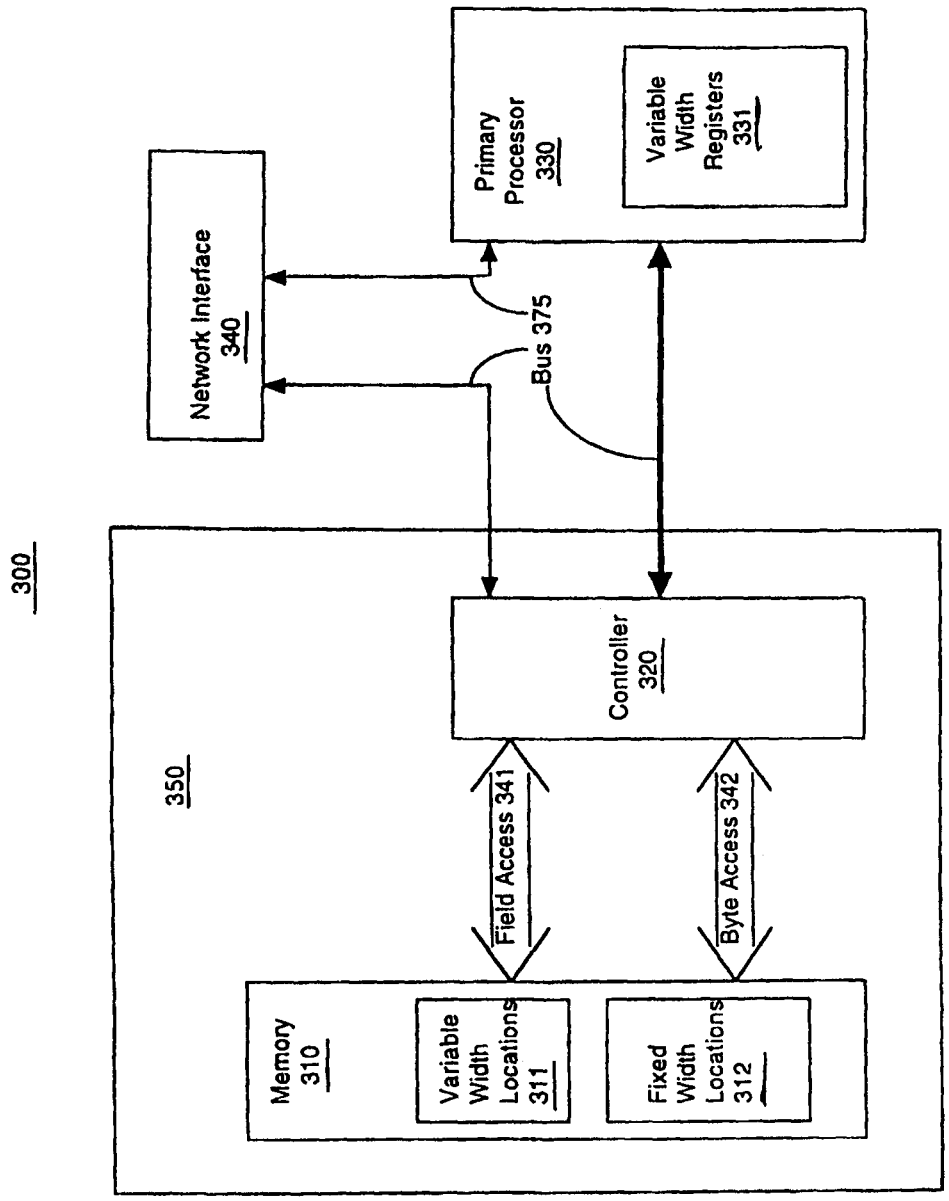

The invention claimed is:

1. A variable width memory system comprising:
a bus for communicating information;
a plurality of single cell variable width memory locations coupled to said bus, said plurality of single cell variable width memory locations store information, wherein said plurality of single cell variable width memory locations receive a number of bits corresponding to the width of the single cell variable width memory locations and the width of a variable width register that is located in a processor associated with said variable width memory system, wherein a variable width mapping process provides a correlation between said single cell variable width memory locations and said variable width register; and
a controller coupled to said bus, said controller directs access to said plurality of single cell variable width memory locations, wherein said number of bits potentially vary automatically on a per access basis depending on which single cell variable width memory location of said plurality of single cell variable width memory locations is being accessed, wherein all memory locations are not required to have the same width.

2. The variable width memory system of claim 1 wherein said plurality of single cell variable width memory locations are included on a single memory substrate.

3. The variable width memory system of claim 1, wherein said plurality of single cell variable width memory locations are included in a random access memory (RAM).

4. The variable width memory system of claim 1, wherein each one of said plurality of single cell variable width memory locations is identified by a unique internal identifier which is referenced by said controller to access said each one of said plurality of single cell variable width memory locations.

5. The variable width memory system of claim 4, wherein said controller maps said unique internal identifier to a particular external indicator, wherein components referred to by said unique internal identifier and said particular external indicator have the same bit width.

6. The variable width memory system of claim 1, wherein the bit width of at least two of said plurality of single cell variable width memory locations is the same.

7. The variable width memory system of claim 1, wherein the bit width of at least one of said plurality of single cell variable width memory locations is configured in accordance with criteria directed at decreasing processor operations.

8. A variable width memory mapping method comprising:
receiving a register indicator corresponding to a register that is located in a processor;
accessing a single memory cell based on said register indicator, wherein said single memory cell is allocated a storage size correlating to the bit capacity of said register, wherein a variable width mapping process provides a correlation between said single memory cell and said register;
transferring information between said single memory cell and another component, wherein said information includes the same number of bits as said bit capacity; and
potentially varying the bit capacity of said register on a per access basis to memory cells automatically, wherein all memory locations are not required to have the same width.

9. The variable width memory mapping method of claim 8 wherein said register indicator is received from a processor.

10. The variable width memory mapping method of claim 8 wherein said bit capacity is determined by processing criteria associated with a processor.

11. The variable width memory mapping method of claim 8 wherein said information is part of a communication packet.

12. The variable width memory mapping method of claim 8 wherein said information includes data associated with certain fields.

13. The variable width memory mapping method of claim 12 wherein bits included in said data associated with certain fields are sequentially located within said memory cell.

14. The variable width memory mapping method of claim 8 wherein a information storage system with a computer readable medium stores information in accordance with said variable width memory mapping process.

15. A variable memory width assignment method comprising:
analyzing a register configuration specification, wherein said register is located in a processor;
identifying bits in a portion of said register, wherein said portion corresponds to information grouped in an arrangement that facilitates reduction of processing instructions;
assigning a memory location a width equal to the number of said bits in said portion of said register, wherein said register is arranged in accordance with a communications packet configuration specification; and wherein the number of said bits potentially vary automatically on a per access basis to portions of said register when identifying said bits and said width potentially vary automatically on a per access basis when assigning a single cell memory location that is equal to the number of said bits, wherein all memory locations are not required to have the same width, wherein a variable width mapping process provides a correlation between said single cell variable width memory locations and said variable width register.

16. The variable memory width assignment method of claim 15 wherein said memory location is one of a plurality of memory locations of various widths.

17. The variable memory width assignment method of claim 15 wherein said memory location has a unique identifying address.

18. The variable memory width assignment method of claim 15 further comprises providing an association between said memory location and an external identifier.

19. The variable memory width assignment method of claim 15 wherein said bits in said portion of said data block are arranged in a contiguous manner.

20. A variable width memory assignment system comprising:
a means for communicating memory location identifiers;
a means for storing information in uniquely identifiable different width single cell memory locations corresponding to said memory location identifiers, wherein said means for storing said information returns the number of bits equal to the width of one of said uniquely identifiable different width single cell memory locations and the width of a register that is located in a processor associated with said variable width memory assignment system in response to a read request, wherein the number of bits returned by said means for storing information are potentially varied automatically per read request due to which of said uniquely identifiable different width single cell memory locations is being accessed by said read request; and
a means for managing a connection with said uniquely identifiable different width single cell memory locations, wherein said means for managing said connection supervises writing and reading of information to and from said uniquely identifiable different width single cell memory locations, wherein all memory locations are not required to have the same width, and wherein a variable width mapping process provides a correlation between said different width single cell memory locations and a variable width register.

21. The variable width memory assignment system of claim 20 wherein said means for managing said connection includes a means for tracking a correspondence between said uniquely identifiable variable memory widths and register identifiers.

22. The variable width memory assignment system of claim 21 wherein said register identifiers are provided by a means for processing said information.

* * * * *

UNITED STATES PATENT AND TRADEMARK OFFICE
CERTIFICATE OF CORRECTION

| | | |
|---|---|---|
| PATENT NO. | : 7,761,683 B2 | Page 1 of 3 |
| APPLICATION NO. | : 10/091698 | |
| DATED | : July 20, 2010 | |
| INVENTOR(S) | : Brian N. Ripley | |

It is certified that error appears in the above-identified patent and that said Letters Patent is hereby corrected as shown below:

Delete the title sheet showing an illustrative figure and substitute the attached title page therefor.

Delete sheet 3 of 6 in figure 3A, and substitute the attached sheet 3.

On Sheet 5 of 6, in figure 4, add element "400", above Figure.

Signed and Sealed this
Eighth Day of November, 2011

David J. Kappos
*Director of the United States Patent and Trademark Office*

(12) United States Patent
Ripley

(10) Patent No.: US 7,761,683 B2
(45) Date of Patent: Jul. 20, 2010

(54) VARIABLE WIDTH MEMORY SYSTEM AND METHOD

(75) Inventor: Brian N. Ripley, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 819 days.

(21) Appl. No.: 10/091,698

(22) Filed: Mar. 5, 2002

(65) Prior Publication Data
US 2003/0172243 A1    Sep. 11, 2003

(51) Int. Cl.
*G06F 12/02* (2006.01)
*G06F 12/04* (2006.01)

(52) U.S. Cl. ............ 711/170; 711/171; 711/172; 711/173; 711/202; 711/212

(58) Field of Classification Search .......... 711/202, 711/170, 171, 172, 173, 212
See application file for complete search history.

(56) References Cited

U.S. PATENT DOCUMENTS

| 6,230,249 | B1* | 5/2001 | Chan et al. | 711/212 |
|---|---|---|---|---|
| 2003/0005254 | A1* | 1/2003 | Triece et al. | 711/200 |
| 2003/0158995 | A1* | 8/2003 | Lee et al. | 711/105 |
| 2004/0019756 | A1* | 1/2004 | Perego et al. | 711/170 |

* cited by examiner

*Primary Examiner*—Sanjiv Shah
*Assistant Examiner*—Midys Rojas

(57) ABSTRACT

A variable width memory system is disclosed. The variable width memory system facilitates efficient utilization of memory resources and delivery of information in a convenient manner. A plurality of memory locations store information and the bit widths of at least two of the memory locations are different. A controller directs access to the plurality of memory locations. Information is communicated between the controller and memory locations via a bus coupled to the controller and memory locations.

22 Claims, 6 Drawing Sheets